Patented Nov. 25, 1941

2,263,623

UNITED STATES PATENT OFFICE 2,263,623

PROCESS FOR OBTAINING CHROMIUM OXIDE

Samuel E. Gertler, Brooklyn, N. Y., assignor of one-half to Harry I. Stein, New York, N. Y.

No Drawing. Application September 11, 1939, Serial No. 294,297

4 Claims. (Cl. 23—145)

The present invention concerns a novel method of obtaining $Cr_2O_3$ from ores containing $Cr_2O_3$, FeO, and other oxides, hereinafter referred to as chromite ores. The invention primarily is concerned with a novel method of reducing that ore to $Cr_2O_3$, with $FeCl_3$ as a valuable by-product.

I am aware that $Cr_2O_3$ has heretofore been obtained from the chromite ore by a relatively prolonged and expensive process.

An object of the invention is a sequence of steps whereby in a novel and extraordinarily cheap and simple manner the chromite ore is reduced to powdered $Cr_2O_3$ of substantially 100% purity, and whereby $FeCl_3$ may be obtained as a by-product, in quality and quantity of value sufficient in itself more than to repay all expenses of the process, from the ore to the pure chromium oxide.

The process is as follows:

The chromite or other chromium and iron containing ore is reduced to powder in any suitable way. It is then heated in an oven to a temperature preferably from 750° C. to 900° C., or until it is dull red. The fumes of HCl or chlorine gas are then passed over it, with resultant formation of gaseous $CrO_2Cl_2$ and gaseous $FeCl_3$. These gases, as formed, are drawn from the oven. The chlorination temperature can be lowered by having a reducing atmosphere.

The vaporization point of $FeCl_3$ is approximately 315° C, and the vaporization point $CrO_2Cl_2$ approximately 176° C. This difference in vaporization points of the two gases presents the possibility of their separation by distillation and condensation, and is utilized in the present invention.

The mixed gases together with uncombined chlorine are led from the oven to a chamber or condenser in which a temperature is maintained which is slightly lower than 315° C., but greater than 176° C. Here the gaseous $FeCl_3$ is condensed and allowed to collect as a liquid to be drawn off periodically for use in other arts.

The gaseous $CrO_2Cl_2$, now unmixed with $FeCl_3$, but still mixed with uncombined chlorine, passes from the first condensing chamber to another chamber in which is maintained a temperature lower than 176° C. In this second chamber the $CrO_2Cl_2$ will be condensed as a liquid, while the free or uncombined chlorine is drawn off as a gas and collected for re-use.

In the preferred practice of the invention, the liquid $CrO_2Cl_2$ is made to flow into a receptacle or tube heated to a dull red. The receptacle must not be of a material which at this temperature will combine with chlorine. It may be of any steel alloy which is inert to chlorine or may be of any suitable material, such as ordinary steel or iron, provided the same is lined with a material, such as pyrex glass, inert to chlorine. At this temperature the $CrO_2Cl_2$ is broken down and the chlorine released as a gas, depositing the $Cr_2O_3$ as a powder. The chlorine which has been released is drawn off and collected for re-use.

As a modification of the foregoing process, I may employ the following procedure:

Instead of passing the mixed gases from the chlorination chamber into a chamber where the gaseous $FeCl_3$ is condensed into a liquid and $CrO_2Cl_2$ drawn off as a gas, I may pass the mixed gases from the chlorination chamber into another chamber in which the temperature is at a point below the vaporization point of both $FeCl_3$ and $CrO_2Cl_2$, thereby causing both of these gases to be condensed into mixed liquids of $FeCl_3$ and $CrO_2Cl_2$. In this chamber the free or excess chlorine will be drawn off in gaseous condition and re-used. These mixed liquids I may then pass into another chamber in which is maintained a temperature somewhat below the vaporization point of $FeCl_3$, but above the vaporization point of $CrO_2Cl_2$. In this last chamber, therefore, the $CrO_2Cl_2$ will be transformed to a gaseous condition and may be drawn off and passed, as a gas to another chamber, which is heated to a dull red heat, and in which latter chamber the $CrO_2Cl_2$ will be decomposed, and the chlorine released and passed off as a gas, while the $Cr_2O_3$ will be deposited as a powder.

It is obvious that within the scope of the invention other variations may be made in the steps of the process above described.

I claim:

1. A method of obtaining chromium oxide, consisting in passing fumes of an inorganic gas containing chlorine over a granular mass of chromite ore, heated to a combining temperature, to form $CrO_2Cl_2$ and $FeCl_3$, in a gaseous condition, directing said mixed gases into a chamber in which is maintained a temperature between those of the points of vaporization of the two gases, $CrO_2Cl_2$ and $FeCl_3$, thus causing condensation of the gaseous $FeCl_3$ while maintaining the $CrO_2Cl_2$ as a gas, separating said gas from said liquid $FeCl_3$, then causing the temperature of the gaseous $CrO_2Cl_2$ to be lowered to a point where the $CrO_2Cl_2$ is condensed as a liquid, and then passing said liquid $CrO_2Cl_2$ into a receptacle heated to a dull red, to release the chlorine therefrom and to cause $Cr_2O_3$ to be left as a deposit.

2. A method of obtaining chromium oxide, consisting in passing fumes of an inorganic gas containing chlorine over a granular mass of the chromite ore, heated to a combining temperature, to form $CrO_2Cl_2$ and $FeCl_3$, in a gaseous condition, directing said mixed gases into a chamber in which is maintained a temperature between those of the points of vaporization of the two gases, $CrO_2Cl_2$ and $FeCl_3$, thus causing condensation of the gaseous $FeCl_3$ while maintaining the $CrO_2Cl_2$ as a gas, drawing off such gaseous $CrO_2Cl_2$ and discharging the same into a chamber where the $CrO_2Cl_2$ is cooled to the point of condensation thereof as a liquid, and passing said liquid into a receptacle heated to a dull red, to release the chlorine therefrom and to cause $Cr_2O_3$ to be left as a deposit.

3. A method of obtaining chromium oxide, consisting in passing fumes of an inorganic gas containing chlorine over a granular mass of the chromite ore, heated to a combining temperature, to form $CrO_2Cl_2$ and $FeCl_3$, in a gaseous condition, directing said mixed gases into a chamber in which is maintained a temperature less than 315° C. but greater than 176° C. whereby to cause the gaseous $FeCl_3$ to be condensed as a liquid while the $CrO_2Cl_2$ remains as a gas, separating said gases from said liquid $FeCl_3$ then causing the temperature of the $CrO_2Cl_2$ gas to be lowered below 176° C. whereby the $CrO_2Cl_2$ is condensed as a liquid, and then passing said $CrO_2Cl_2$ in fluid condition into a chamber heated to a dull red, to release the chlorine therefrom and to cause $Cr_2O_3$ to be left as a deposit.

4. A method of obtaining chromium oxide, consisting in passing fumes of an inorganic gas containing chlorine over a granular mass of chromite ore, heated to a combining temperature, to form $CrO_2Cl_2$ and $FeCl_3$, in a gaseous condition, passing said mixed gases into a chamber in which is maintained a temperature below the vaporization points of both $CrO_2Cl_2$ and $FeCl_3$, thus condensing said gases as mixed liquids, heating said mixed liquids to vaporize the $CrO_2Cl_2$, separating the vapor of $CrO_2Cl_2$ from the liquid $FeCl_3$ and heating said vapor of $CrO_2Cl_2$ to a temperature sufficient to decompose the same and release the chlorine therein and to obtain $Cr_2O_3$ as a powdered deposit.

SAMUEL E. GERTLER.